United States Patent
Horng et al.

(10) Patent No.: US 6,949,899 B2
(45) Date of Patent: Sep. 27, 2005

(54) BRUSHLESS DC MOTOR HAVING AN AC POWER CONTROL DEVICE

(75) Inventors: Alex Horng, Kaohsiung (TW); Wen-Chung Wu, Kaohsiung Hsien (TW); Chung-Ken Cheng, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 88 days.

(21) Appl. No.: 10/623,509

(22) Filed: Jul. 22, 2003

(65) Prior Publication Data
US 2005/0017665 A1 Jan. 27, 2005

(51) Int. Cl.$^7$ .................................................. H02P 1/18
(52) U.S. Cl. ...................... 318/254; 318/138; 318/439; 318/461; 388/800; 388/907.5
(58) Field of Search ................................. 318/138, 254, 318/439, 461, 257, 268; 388/800, 801, 803, 806, 815, 822, 823, 907, 907.5

(56) References Cited

U.S. PATENT DOCUMENTS

| | | | | |
|---|---|---|---|---|
| 4,234,834 A | * | 11/1980 | Jennings | .................... 318/285 |
| 4,329,630 A | * | 5/1982 | Park | ............................ 318/258 |
| 4,494,057 A | * | 1/1985 | Hotta | ........................... 388/821 |
| 5,606,232 A | * | 2/1997 | Harlan et al. | ................ 318/138 |
| 6,069,428 A | * | 5/2000 | Nelson | ......................... 310/90 |
| 6,278,248 B1 | | 8/2001 | Hong et al. | |
| 6,307,337 B1 | * | 10/2001 | Nelson | ........................ 318/254 |
| 6,577,031 B2 | * | 6/2003 | Morooka et al. | .......... 310/68 R |

* cited by examiner

*Primary Examiner*—Rina Duda
(74) *Attorney, Agent, or Firm*—Bacon & Thomas, PLLC

(57) ABSTRACT

A brushless dc motor includes a conversion circuit and a dc motor drive circuit. The conversion circuit includes a rectifier unit, a pulse-wave-absorbing unit, a filter unit, a voltage-stabilizing control unit and a voltage-stabilizing unit. The rectifier unit, the pulse-wave-absorbing unit and the filter unit are serially connected between an ac power source and the dc motor drive circuit. The ac power source is rectified, stabilized and filtered to thereby supply with a dc voltage to the dc motor drive circuit. The voltage-stabilizing control unit and the voltage-stabilizing unit are serially connected between the rectifier unit and the dc motor drive circuit so as to limit a passage of a high voltage and to allow a passage of a low voltage through the dc motor drive circuit. Thereby, the voltage-stabilizing control unit and the voltage-stabilizing unit are commonly in control of the operation of the dc motor drive circuit.

9 Claims, 4 Drawing Sheets

BRUSHLESS DC MOTOR HAVING AN AC POWER CONTROL DEVICE

BACKGROUND OF THE INVENTION

1. Field of the Invention

The present invention is related to a brushless dc motor having an ac control device. More particularly, the present invention is related to a brushless dc motor using a rectifier unit, a voltage-stabilizing control unit and a voltage-stabilizing unit to rectify and stabilize an ac power source.

2. Description of the Related Art

Referring to FIG. 1, U.S. Pat. No. 6,278,248, entitled "BRUSHLESS DC MOTOR FAN DRIVEN BY AN AC POWER SOURCE", issued on Aug. 21, 2001 to HORNG et al, discloses a brushless dc motor fan. The brushless dc fan motor includes a converter circuit 1 consisted of a bridge rectifier 11, a resistor 12 and a filter 13. The converter circuit 1 employs the bridge rectifier 11 to convert an ac voltage into a dc voltage and to supply it to a motor drive circuit 2 and a sensor element 20. The resistor 12 is adapted to step down the dc voltage supplied from the rectifier 11 so that a step-down voltage is suitable for the use of the brushless dc motor. Consequently, the application of the brushless dc motor fan is suitable for ac power and may not be limited by a necessity of dc power.

The resistor 12 of the converter circuit 1 functions to step down an ac voltage so that the ac voltage is transformed into a low dc voltage that is suitable for a miniature brushless dc motor. For example, dc 110 V is transformed into dc 12 V or dc 220 V into dc 24 V. In this circumstance, the power consumption of the resistor 12 may result in a successive production of great heat. Thus, the brushless dc motor must be overheated in the normal operation when it is normally operated.

In addition, once the brushless motor is jammed, locked or failed, a rated current passed through the resistor 12 has a sudden increase that the power consumption of the resistor 12 may be increased. Consequently, the motor components including the resistor 12 may be destroyed if the power consumption is exceeded.

Referring to FIG. 2, U.S. Pat. No. 6,278,248 further discloses another converter circuit 1' consisted of a capacitor set 14, a resistor set 15 and a zenor diode 16. The capacitor set 14 is a set of electrolytic capacitors adapted to filter power, and has a key feature of high Dissipation Factor (DF) that may result in a successive production of great heat. Similarly, the resistor set 15 may also result in a successive production of great heat.

The present invention intends to provide a brushless dc motor having an ac control device which includes a rectifier unit adapted to rectifier an ac power source. The ac control device further includes a voltage-stabilizing control unit and a voltage-stabilizing unit to thereby stabilize a dc power source converted from the ac power source in such a way to mitigate and overcome the above problem.

SUMMARY OF THE INVENTION

The primary objective of this invention is to provide a brushless dc motor having an ac control device, which includes a rectifier unit to rectifier an ac power source. The ac control device further includes a voltage-stabilizing control unit and a voltage-stabilizing unit to thereby stabilize a dc power source converted from the ac power source. The ac control device accomplishes to limit a passage of a high voltage and to allow a passage of a low voltage supplied from the dc power source into a motor drive circuit. Thereby, the brushless dc motor may reduce the power consumption and prolong the useful life.

The secondary objective of this invention is to provide the brushless dc motor having the ac power control device, which includes a rectifier serially connected to a pulse-wave-absorbing unit and a filter unit to thereby protect a motor drive circuit.

The brushless dc motor having ac power control device in accordance with the present invention includes a conversion circuit and a dc motor drive circuit. The conversion circuit includes a rectifier unit, a pulse-wave-absorbing unit, a filter unit, a voltage-stabilizing control unit and a voltage-stabilizing unit. The rectifier unit, the pulse-wave-absorbing unit and the filter unit are serially connected between an ac power source and the dc motor drive circuit. The ac power source is rectified, stabilized and filtered to thereby supply with a dc voltage to the dc motor drive circuit. The voltage-stabilizing control unit and the voltage-stabilizing unit are serially connected between the rectifier unit and the dc motor drive circuit so as to limit a passage of a high voltage and to allow a passage of a low voltage through the dc motor drive circuit. Thereby, the voltage-stabilizing control unit and the voltage-stabilizing unit are commonly in control of the operation of the dc motor drive circuit.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
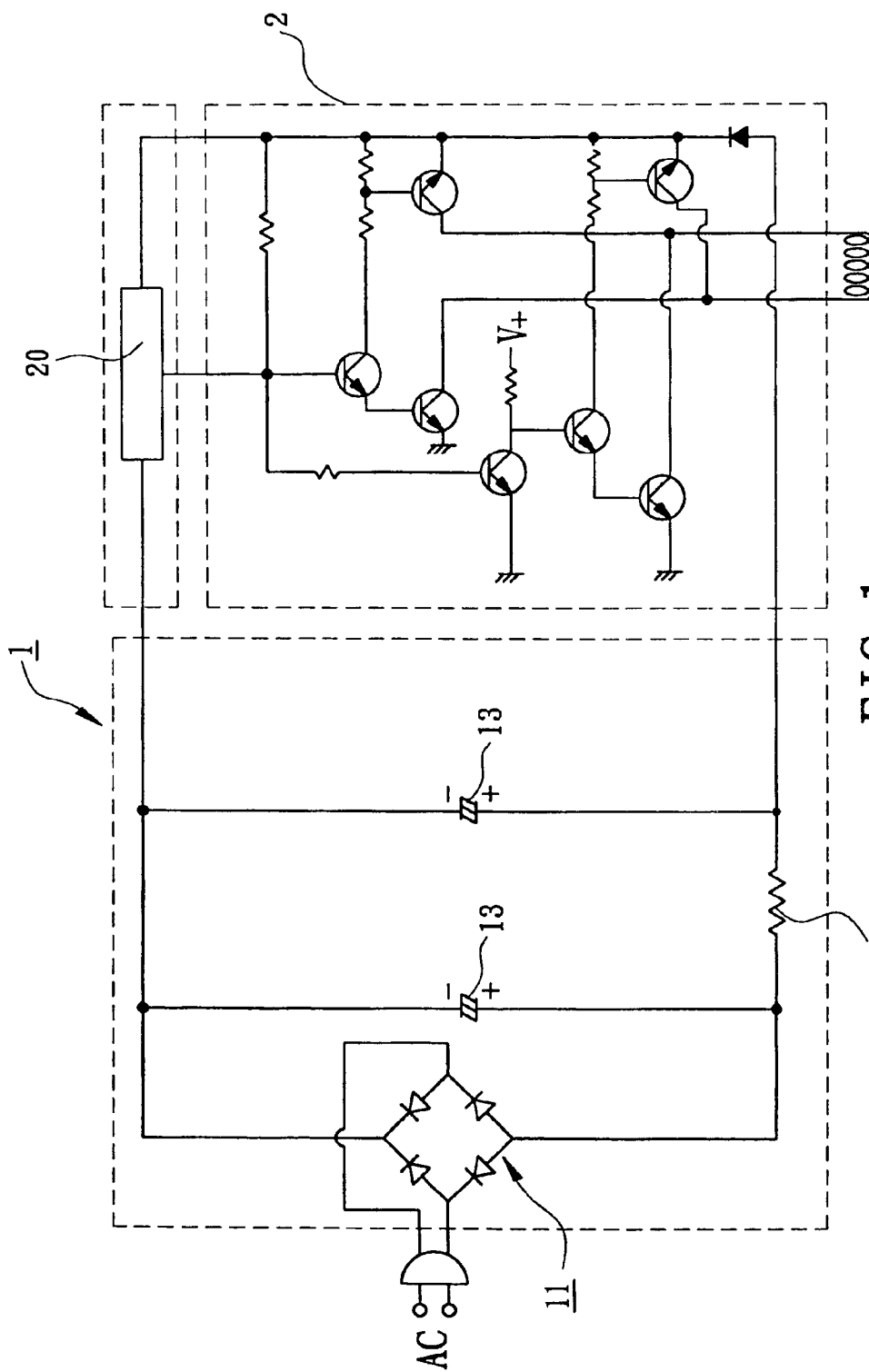
FIG. 1 is a schematic circuitry of a converter circuit for a brushless dc motor fan in accordance with the prior art.
Figure 2:
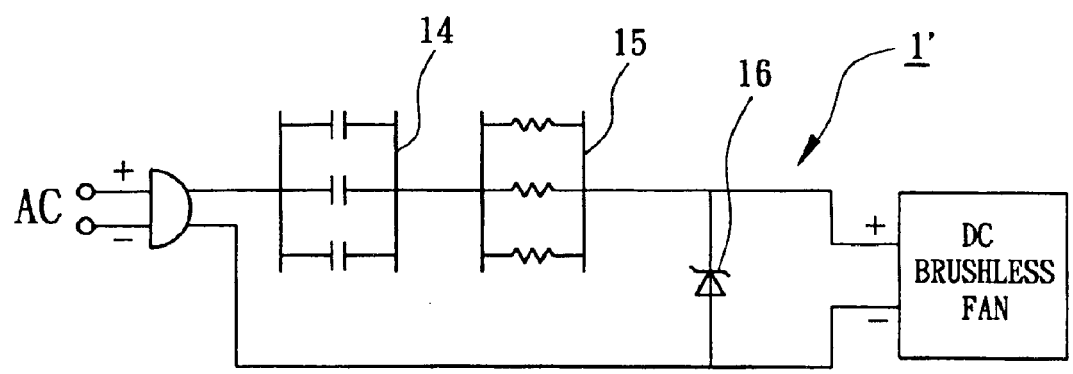
FIG. 2 is a schematic circuitry of another converter circuit for a brushless dc motor fan in accordance with the prior art.
Figure 3:
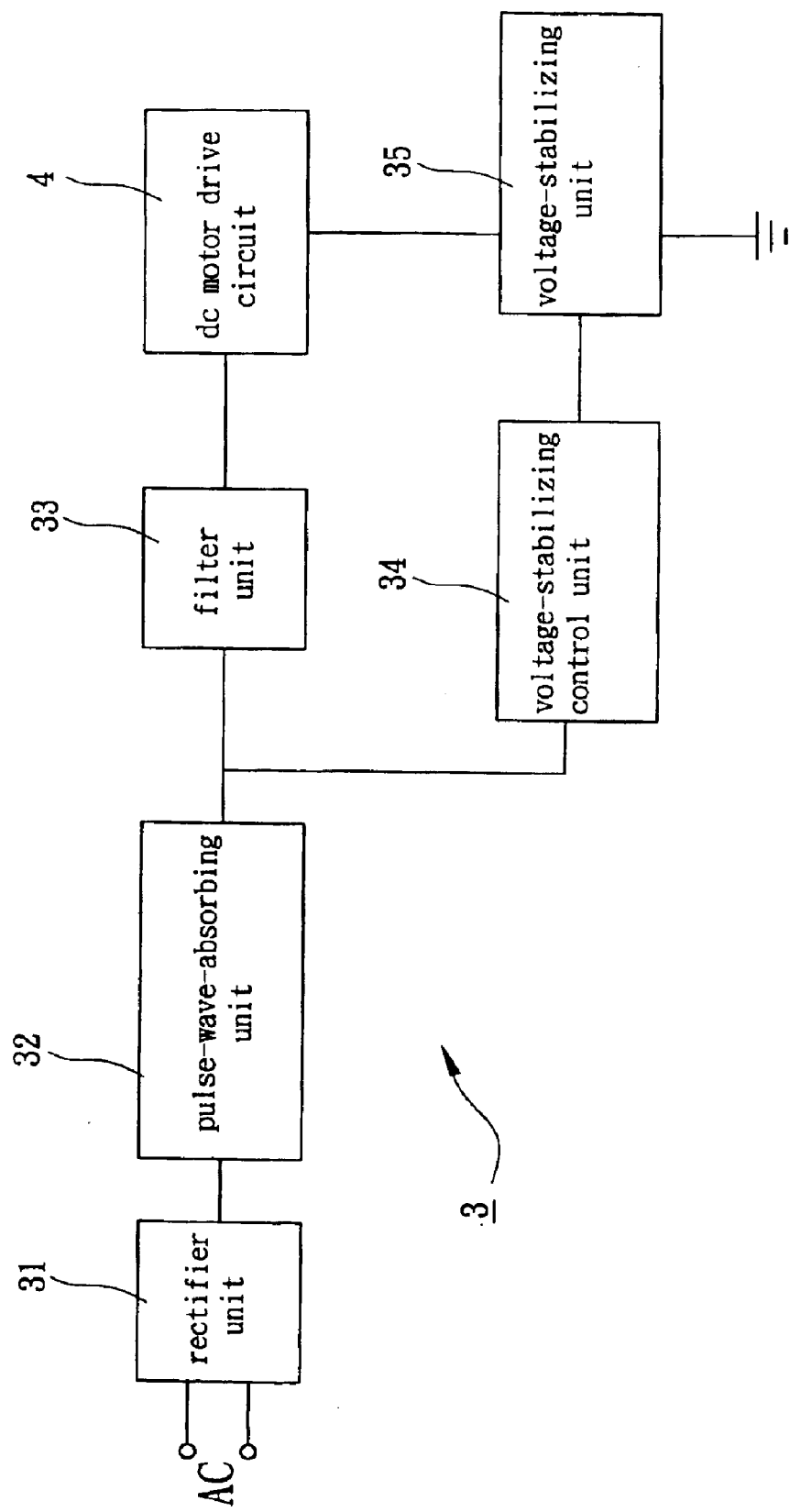
FIG. 3 is a block diagram of a brushless dc motor having an ac power control device in accordance with a preferred embodiment of the present invention.
Figure 4:
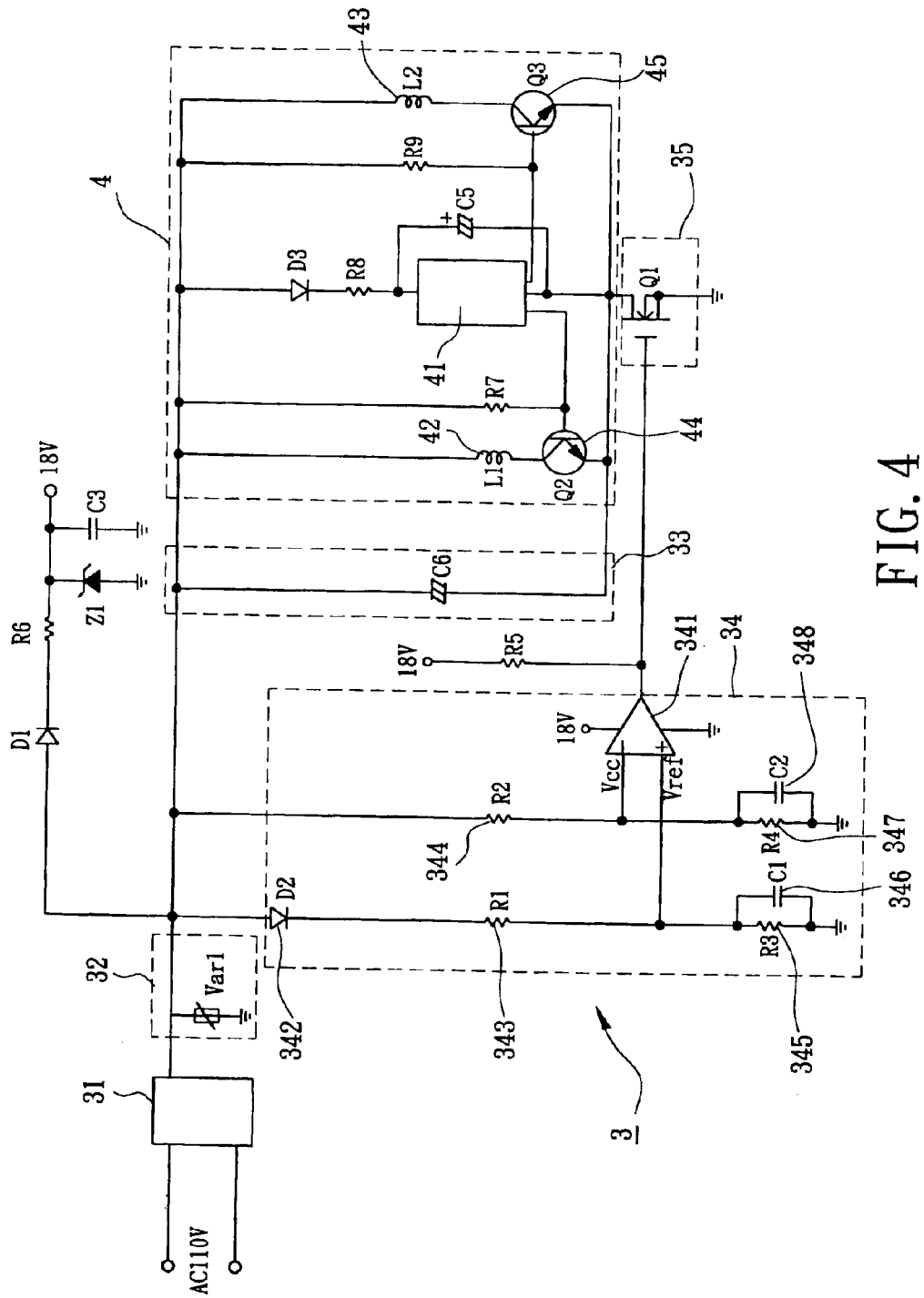
FIG. 4 is a schematic circuitry of the brushless dc motor having an ac power control device in accordance with the preferred embodiment of the present invention.

Referring to FIG. 3, it illustrates a block diagram of a brushless dc motor having an ac power control device in accordance with a preferred embodiment of the present invention. Referring to FIG. 4, it illustrates a schematic circuitry of the brushless dc motor connected with the ac power control device in accordance with the preferred embodiment of the present invention.

Referring again to FIG. 3, a brushless dc motor in accordance with the present invention include a conversion circuit 3 and a dc motor drive circuit 4. The conversion circuit 3 is serially connected between an ac power source and a dc motor drive circuit 4. The conversion circuit 3 is adapted to convert an ac voltage into a dc voltage, such as 12 V, that is suitable for the miniature brushless dc motor. The conversion circuit 3 includes a rectifier unit 31, pulse-wave-absorbing unit 32, a filter unit 33, a voltage-stabilizing control unit 34 and a voltage-stabilizing unit 35.

Referring again to FIG. 3, the rectifier unit 31, the pulse-wave-absorbing unit 32 and the filter unit 33 are serially connected between an ac power source and the dc motor drive circuit 4. Consequently, the ac power source is rectified, stabilized and filtered to thereby supply with a dc voltage to the dc motor drive circuit 4.

Turning now to FIGS. 3 and 4, the rectifier unit 31 includes an input terminal and an output terminal. The input terminal is electrically connected to the ac power source. The output terminal is electrically connected to the pulse-wave-absorbing unit 32. In operation, the rectifier unit 31 is adapted to convert an ac voltage into a dc voltage for supplying to the dc motor drive circuit 4. Preferably, the rectifier 31 is selected from a group consisted of a bridge rectifier and a diode.

Referring again to FIGS. 3 and 4, the pulse-wave-absorbing unit 32 is connected between the rectifier unit 31 and the filter unit 33, and adapted to absorb a pulse wave generated from the ac power source to thereby prevent damage to motor components. Preferably, the pulse-wave-absorbing unit 32 is a varistor which has a voltage characteristic that varies nonlinearly with respect to its resistance. The varistor, usually a dipole semiconductor device, has a specific decrease of resistance, as the voltage is increased. Namely, in the varistor, an increase in the voltage can result in a specific decrease in the resistance.

Referring again to FIGS. 3 and 4, the filter unit 33 is connected between the pulse-wave-absorbing unit 32 and the dc motor drive circuit 4. The filter unit 33 is a capacitor device to filter the power source. In operation, the rectifier unit 31 serves to supply with a dc voltage that is passed through the pulse-wave-absorbing unit 32 and the filter unit 33. Consequently, a stabilized dc voltage of the filter unit 33 is supplied to the dc motor drive circuit 4 after filtering.

Referring again to FIGS. 3 and 4, the voltage-stabilizing control unit 34 and the voltage-stabilizing unit 35 are serially connected between the rectifier unit 31 and the dc motor drive circuit 4 so as to stabilize the dc voltage supplied from the rectifier unit 31. Thereby, a stabilized dc voltage of the filter unit 33 is supplied to the dc motor drive circuit 4. The voltage-stabilizing control unit 34 and the voltage-stabilizing unit 35 are commonly in control of the operation of the dc motor drive circuit 4. The voltage-stabilizing control unit 34 is consisted of an operational amplifier 341, a diode 342, a first resistor 343, a second resistor 344, a third resistor 345, a first capacitor 346, a fourth resistor 347 and a second capacitor 348. The operational amplifier 341 includes a positive input terminal, a negative input terminal and an output terminal. The positive input terminal of the operational amplifier 341 is connected to the diode 342, the first resistor 343, the third resistor 345 and the first capacitor 346 which are commonly provided with a predetermined floating value of a reference voltage Vref to the positive input terminal. The negative input terminal of the operational amplifier 341 is connected to the fourth resistor 347 and the second capacitor 348 so as to inject the dc voltage Vcc into it. In operation, the operational amplifier 341 compares the reference voltage Vref and the dc voltage Vcc, and outputs the result to the voltage-stabilizing unit 35 to thereby control it.

When the dc voltage Vcc is lower than the reference voltage Vref as detected by the voltage-stabilizing control unit 34 based on comparison of Vcc and Vref as described above, the voltage-stabilizing control unit 34 operates the voltage-stabilizing unit 35 to conduct a current so that a low voltage is thus allowed to pass therethrough. Consequently, it is possible for the dc motor drive circuit 4 to use low rated voltage/power components that are the least expensive components and capable of performing the necessary functions.

When the dc voltage Vcc is greater than the reference voltage Vref, the voltage-stabilizing control unit 34 cuts off the voltage-stabilizing unit 35 so that a high voltage and current are not allowed to pass therethrough. Consequently, it is able to prevent damage to the low rated voltage/power components of the dc motor drive circuit 4. Hence, it has an advantage of that the dc motor drive circuit 4 avoids using high rated voltage/power components due to no passage of high current.

Referring again to FIGS. 3 and 4, preferably, the voltage-stabilizing unit 35 is a MOSFET (Metal-Oxide Semiconductor Field Effect Transistor). The voltage-stabilizing unit 35 is connected between the voltage-stabilizing control unit 34 and the dc motor drive circuit 4. The output of the voltage-stabilizing control unit 34 is adapted to limit a passage of a high voltage and to allow a passage of a low voltage through the dc motor drive circuit 4. Thereby, the voltage-stabilizing control unit 34 and the voltage-stabilizing unit 35 are in control of operation of the dc motor drive circuit 4.

Referring again to FIGS. 3 and 4, the dc motor drive circuit 4 includes a motor drive member 41, a first motor coil 42, a second motor coil 43, a first switch 44 and a second switch 45. The motor drive member 41 serves to alternatively turn on or off the first switch 44 and the second switch 45 to thereby excite them.

Referring back to FIG. 4, when the brushless dc motor is operated, the recitifier unit 31, the pulse-wave-absorbing unit 32 and the filter unit 33 serve to rectify, stabilize and filter the ac power source, and then sent it to the dc motor drive circuit 4. Meanwhile, the voltage-stabilizing control unit 34 is still comparing the dc voltage Vcc and the reference voltage Vref.

When the dc voltage Vcc is lower than the reference voltage Vref, the operational amplifier 341 of the voltage-stabilizing control unit 34 operates the voltage-stabilizing unit 35 to conduct a current that a low voltage is thus allowed to pass therethrough. At this time, the dc voltage supplied from the rectifier unit 41 controls to turn on the first switch 44 and the second switch 45 alternatively through the motor drive member 41 of the dc motor drive circuit 4. Consequently, the first motor coil 42 and the second motor coil 43 are excited alternatively, and then stabilized by the voltage-stabilizing unit 35 that only allows the passage of a low voltage and limits the passage of a high voltage.

Referring again to FIG. 4, the conversion circuit 3 in accordance with the present invention employs the voltage-stabilizing control unit 34 and the voltage-stabilizing unit 35 for protection of the dc motor drive circuit 4. As the dc voltage raises the voltage-stabilizing control unit 34 and the voltage-stabilizing unit 35 are cut off to thereby limit a high current passing through the dc motor drive circuit 4.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A conversion circuit for a brushless dc motor connected with a dc motor drive circuit, comprising:
   a rectifier unit electrically connected to an ac power source to thereby supply a dc voltage to the dc motor drive circuit;
   a voltage-stabilizing control unit electrically connected between the rectifier unit and the dc motor drive circuit, and adapted to detect whether a dc voltage supplied by the rectifier unit to the dc motor drive circuit is a low dc voltage suitable for the brushless dc motor; and a voltage-stabilizing unit electrically connected between the voltage-stabilizing control unit and the dc motor drive circuit, said voltage-stabilizing unit being controlled by the voltage-stabilizing control unit to supply a stabilized dc voltage to the dc motor drive circuit only if the voltage-stabilizing control unit detects that the dc voltage supplied by the rectifier unit is said low dc voltage;

wherein the dc voltage supplied from the rectifier unit is passed through the voltage-stabilizing control unit controlled by the voltage-stabilizing unit to turn on or off the dc motor drive circuit, said voltage-stabilizing control unit cutting off supply of dc voltage to the dc motor drive circuit when a high dc voltage is detected.

2. The conversion circuit for the brushless dc motor as defined in claim 1, wherein the rectifier unit is selected from the group consisting of a bridge rectifier and a diode.

3. The conversion circuit for the brushless dc motor as defined in claim 1, further comprising a pulse-wave-absorbing unit serially connected between the rectifier unit and the dc motor drive circuit.

4. The conversion circuit for the brushless dc motor as defined in claim 3, wherein the pulse-wave-absorbing unit is a varistor.

5. The conversion circuit for the brushless dc motor as defined in claim 1, further comprising a filter unit serially connected between the rectifier unit and the dc motor drive circuit.

6. The conversion circuit for the brushless dc motor as defined in claim 5, wherein the filter unit is a capacitor.

7. The conversion circuit for the brushless dc motor as defined in claim 1, wherein the voltage-stabilizing control unit includes an operational amplifier, a diode, a first resistor, a second resistor, a third resistor, a first capacitor, a fourth resistor and a second capacitor.

8. The conversion circuit for the brushless dc motor as defined in claim 7, wherein the diode, the first resistor, the third resistor and the first capacitor are commonly provided with a predetermined floating value of a reference voltage input into the operational amplifier for comparing with the dc voltage.

9. The conversion circuit for the brushless dc motor as defined in claim 1, wherein the voltage-stabilizing unit is a Metal-Oxide Semiconductor Field Effect Transistor.

* * * * *

UNITED STATES PATENT AND TRADEMARK OFFICE
CERTIFICATE OF CORRECTION

PATENT NO. : 6,949,899 B2 Page 1 of 1
APPLICATION NO. : 10/623509
DATED : September 27, 2005
INVENTOR(S) : Alex Horng et al.

It is certified that error appears in the above-identified patent and that said Letters Patent is hereby corrected as shown below:

In col. 5, lines 13-14, change "voltage-stabilizing control unit controlled by the voltage-stabilizing unit" to --voltage-stabilizing unit controlled by the voltage-stabilizing control unit--.

Signed and Sealed this

Thirteenth Day of February, 2007

JON W. DUDAS
*Director of the United States Patent and Trademark Office*